Nov. 15, 1966  L. D. BABUSCI ETAL  3,285,784
NICKEL-CADMIUM BATTERY RECEPTACLE
Filed Nov. 5, 1964

INVENTORS  L. D. BABUSCI
D. O. FEDER
BY
ATTORNEY

United States Patent Office 3,285,784
Patented Nov. 15, 1966

3,285,784
NICKEL-CADMIUM BATTERY RECEPTACLE
Louis D. Babusci, Orange, and David O. Feder, Madison, N.J., assignors to Bell Telephone Laboratories, Incorporated, New York, N.Y., a corporation of New York
Filed Nov. 5, 1964, Ser. No. 409,239
5 Claims. (Cl. 136—133)

This invention relates to a receptacle for alkaline storage cells. More specifically, it is directed to a sealed battery case designed to avoid violent separation when internal gas pressures become excessive.

A principal disadvantage of alkaline storage cells, particularly nickel-cadmium sealed batteries, continues to be their propensity to build up high internal gas pressures when cycled under severe conditions or when overdischarged. In such instances the case enclosing the cell occasionally ruptures or separates with such violence that the cell becomes a hazard to operating personnel and contiguous equipment. One manner of obviating this deficiency is to enclose or encapsulate the cell in a shatterproof medium such as resin reinforced by a fibre or wire matte. A particularly effective method of this nature is to cast the cell in a resilient polymer. Silicone rubber has been found to be especially useful for this purpose.

However, such precautionary constructions have an additional cost factor and are necessarily larger in volume. A typical construction utilizing a rubber case is more than twice the volume of the basic cell.

By utilizing a cell construction according to the teachings of this invention the cell size is unaffected, the difference in cost of manufacture is negligible and an effective explosion-proof cell is obtained.

The battery type to which this invention is most effectively applied is the so-called button-type nickel-cadmium cell described in United States Patent No. 2,843,650 issued to P. A. C. Jacquier on July 15, 1958. The type of case used in this construction is a common type and consists basically of a can having a large diameter relative to height, a sealing gasket overlying the rim of the can to provide a gas tight seal and a lid forcibly engaging the gasket.

Several cells of this design were cycled under severe test conditions and their behavior as a result of excessive internal gas pressures was studied in detail. Specifically the cells were overdischarged at a rate of 300 ma. (the one hour rate). This means that $H_2$ is generated in accordance with Faraday's law, the amount of gas (and consequently the internal gas pressure) increasing in proportion to the direction of current flow. Time sequence photographs show that the lid of the battery case separates from the can as the internal gas pressure rises. This separation is unexpectedly slow. Just prior to separation the lid disengages the can with explosive force.

The battery case design of this invention permits the excessive internal gas pressures to vent to the atmosphere before the lid disengages the can. As a result complete separation of the case components does not occur.

These and other aspects of the invention will become apparent from a consideration of the following detailed description. In the drawing.

Figure 1:
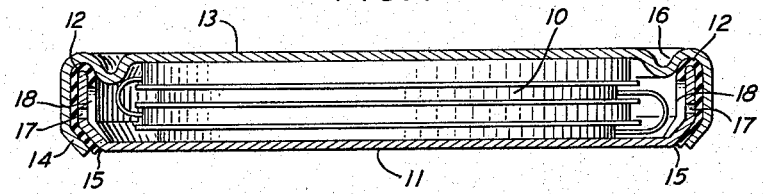
FIG. 1 is a front sectional view of a cell designed in accordance with this invention.
Figure 1A:
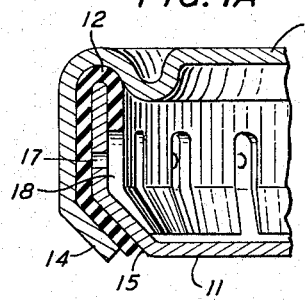
FIG. 1A is a front sectional view of a portion of the cell of FIG. 1 showing the vent construction in greater detail.

In FIG. 1, 10 denotes the plate assembly which comprises alternate nickel hydroxide impregnated and cadmium hydroxide impregnated sintered nickel microporous plates with conventional separators therebetween. The plate construction and electrolyte form no part of this invention. The plate assembly is contained in the inner cap 11. An inverted U-shaped gasket 12 is installed over the rim of the inner cap 11 and the lid 13 is forced over the inner cap thereby providing a gas tight seal between the two portions of the can. The lower edge of the lid 14 is crimped or rolled inward to engage the beveled portion 15 of the inner cap. This provides an effective seal since the tendency of the can to separate promotes more forcible engagement between the crimped edge 14 and the inner cap at 15. The indentation 16 in the lid of the can serves to maintain the gasket 12 and inner cap 11 in the desired position. The bottom plate of the plate assembly 10 is of opposite polarity to the top plate of the assembly so that the inner cap 11 contacts the lower plate and serves as one electrode contact while the lid 13 contacts the topmost electrode and serves as the other electrode. The gasket functions as an electrical insulator between the mating sections of the can. Various spring biasing means are known in the art for preserving the contact between the sections of the can and the plate assembly.

Figure 2:
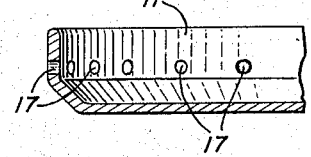
FIG. 2 is a perspective view of the inner part of the case of the cell of FIG. 1.

According to the teachings of this invention there are provided a plurality of holes 17 around the periphery of the inner cap 11. In the particular construction shown these are preferably located on the vertical portion of the edge of the cap 11, although effective results can also be obtained with holes located on the beveled portion 15. The position of these vent holes depends on the relative dimensions of the can and it will be understood that reference to vent holes in the edge portion of the inner part of the can is intended to describe the broader aspects of the invention. If the U-shaped seal gasket is designed to depend into the interior portion of the can so as to cover the holes 17, provision for the escape of gas through the gasket should also be made. Holes or slots 18 in the gasket relative to mating cap holes can be provided for this purpose. The construction of the inner cap 11 and the position of the vent holes 17 is shown in perspective in FIG. 2.

Figure 3:
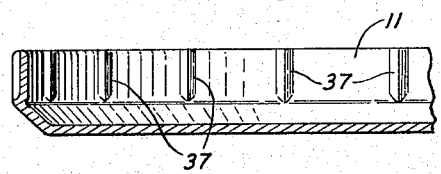
FIG. 3 is a perspective representation of an alternative construction of the element of FIG. 2.
Figure 4:
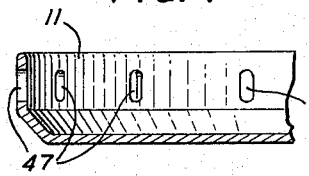
FIG. 4 is a perspective view of yet another possible construction for the inner part of the cell case.

The basic purpose of providing a vent to the interior of the cell upon incomplete separation of the can may be achieved in many alternative forms. Possible alternatives are illustrated by FIGS. 3 and 4. In FIG. 3 the inner cap 11 is shown provided with vents 37 in the form of indentations.

In FIG. 4 the inner cap 11 is provided with slots 47 which provide effective venting of the cell upon partial separation.

Figure 5:
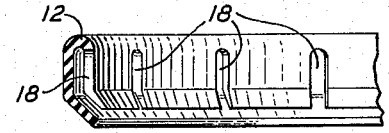
FIG. 5 is a perspective illustration of a sealing gasket made in accordance with the teachings of this invention.

FIG. 5 illustrates in perspective view a typical gasket construction which can be used in combination with any of the aforementioned vent designs. Holes or ridges in the gasket 12 may serve equally as well as the slots 18. The provision for venting of gases through the gasket 12 may in some cases be optional since the gasket is often sufficiently resilient to permit gases to pass by deforming the gasket.

Various combinations of venting means operating by cooperation between the vents provided in the gasket and those in the inner cap 11 can be envisioned.

Figure 6:
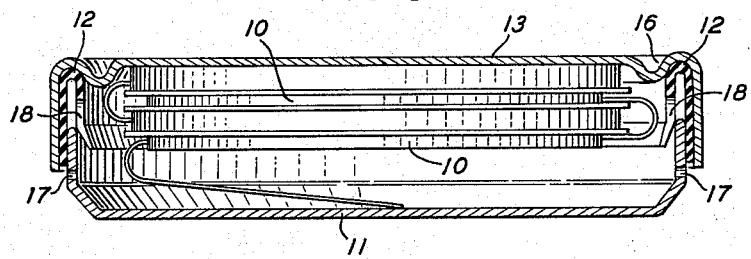
FIG. 6 is a perspective view of the cell of FIG. 1 after separation of the battery case to the point at which internal gas pressure is relieved.

FIG. 6 illustrates the venting action of the cell of FIG. 1 upon partial separation. As gas builds up within the cell the crimped portion 14 of the lid 13 is forced upward along the edge of the inner cap 11. When the lid reaches the point shown in the figure the gases are vented from the interior of the cell through the vent holes 17. The gas pressure is instantly relieved and further separation does not occur.

The foregoing description makes use of a particular cell design for the purpose of convenience in providing a clear and concise explanation. Other cell designs can also make use of the principles of the invention but of particular interest are those in which two halves of a cylindrical can are forcibly engaged one within the other through the use of an insulating gasket. These cells characteristically separate slowly as described without rupture. The recognizing of the mechanism through which failure occurs is an essential feature upon which this invention is based.

Various other modifications and extension of this invention will become apparent to those skilled in the art. All such variations and deviations which basically rely on the teachings through which this invention has advanced the art are properly considered within the spirit and scope of this invention.

What is claimed is:

1. A battery case assembly for a sealed alkaline storage battery comprising a bottom member and a lid member fitted one into the other, said bottom member having a side wall with holes through the side wall spaced around its periphery, an inverted substantially U-sectioned insulating bushing mounted on said side wall with its U-bend positioned on the rim of said wall, said lid member having its rim portion turned down against said bottom member to compress the bushing and seal the interior of the cell.

2. The battery case assembly of claim 1 wherein the holes are slot-shaped.

3. The battery case assembly of claim 1 wherein the substantially U-sectioned bushing has holes therethrough on the interior leg of the U-section in substantial registry with the holes provided in the side wall.

4. The battery case assembly of claim 3 wherein the holes through the bushing are slot-shaped.

5. A battery case assembly for a sealed alkaline storage battery comprising a bottom member and a lid member fitted one into the other, said bottom member having a side wall with indented portion spaced peripherally on the exterior of the side wall and extending vertically down from the top of the side wall, an inverted, substantially U-sectioned insulating bushing mounted on said side wall with its U-bend positioned on the rim of said wall, said lid member having its rim portion turned down against said bottom member to compress the bushing and seal the interior of the cell.

References Cited by the Examiner

UNITED STATES PATENTS 2,054,094 9/1936 Murch _____ 220—44
2,606,941 8/1952 Ruben _____ 136—133 XR

FOREIGN PATENTS 617,756 2/1949 Great Britain.

WINSTON A. DOUGLAS, *Primary Examiner.*

JOHN H. MACK, *Examiner.*

D. L. WALTON, *Assistant Examiner.*